May 12, 1964
C. H. WATKINS
3,133,013
HYDROREFINING OF COKE-FORMING HYDROCARBON DISTILLATES
Filed Jan. 23, 1961
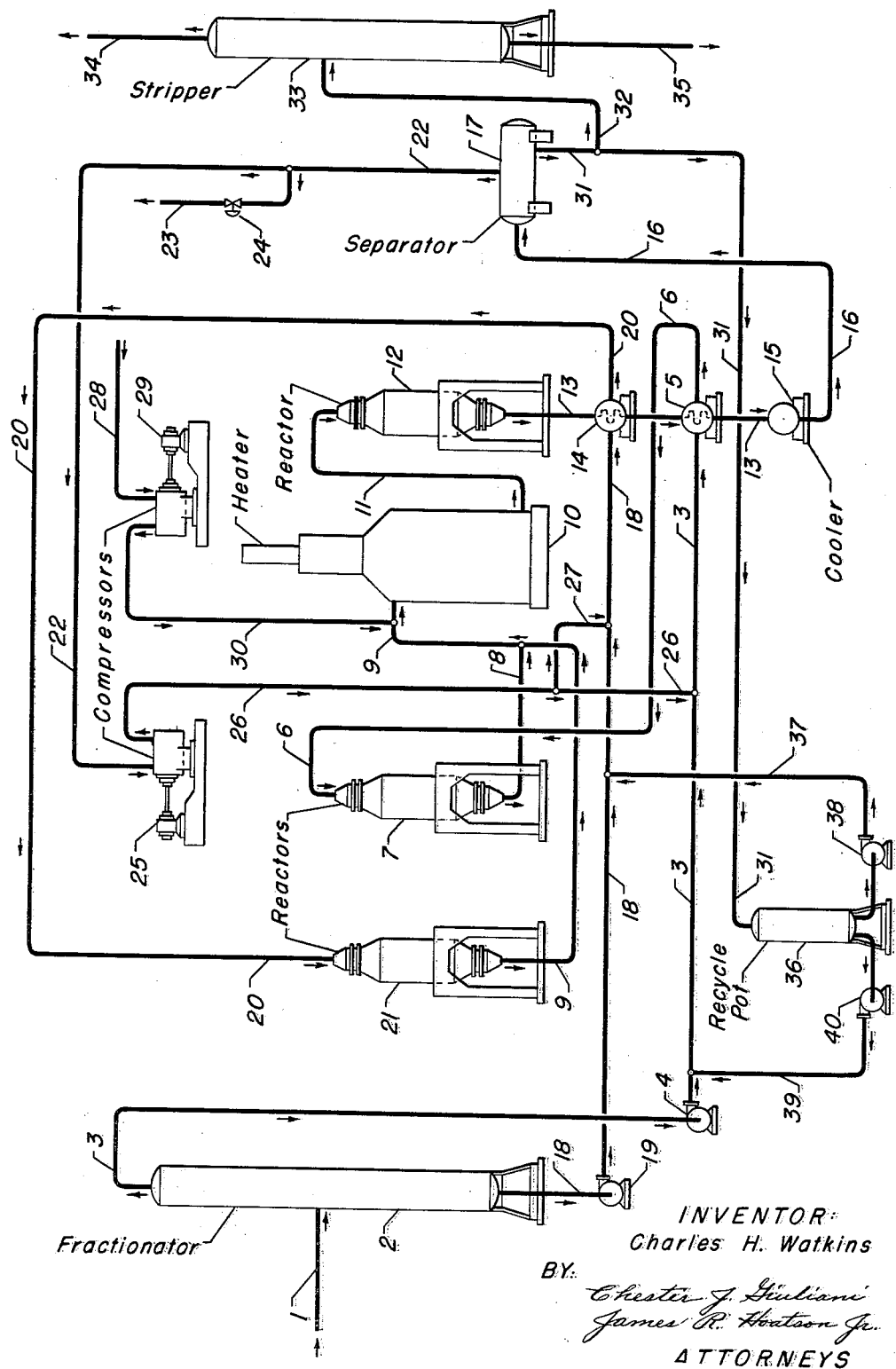
INVENTOR:
Charles H. Watkins
BY:
ATTORNEYS

United States Patent Office 3,133,013
Patented May 12, 1964

3,133,013
HYDROREFINING OF COKE-FORMING HYDROCARBON DISTILLATES
Charles H. Watkins, Arlington Heights, Ill., assignor to Universal Oil Products Company, Des Plaines, Ill., a corporation of Delaware
Filed Jan. 23, 1961, Ser. No. 84,155
8 Claims. (Cl. 208—210)

The present invention relates to the hydrorefining of hydrocarbons, mixtures of hydrocarbons, various hydrocarbon fractions and hydrocarbon distillates, for the purpose of removing diverse contaminants therefrom and/or reacting such hydrocarbons to improve the chemical and physical characteristics thereof. More specifically, the process described herein is directed toward the selective hydrogenation of unsaturated, coke-forming hydrocarbons through the use of particular conditions of operation and processing techniques whereby the formation of coke and other heavy carbonaceous material, otherwise resulting from the hydrorefining of such hydrocarbon fractions and distillates, is effectively inhibited.

In the present specification and appended claims, the various terms, "hydrocarbons," "hydrocarbon fractions," "hydrocarbon distillates," and "hydrocarbon mixtures," are intended to be synonomous, and connote various hydrocarbons and mixtures of hydrocarbons which may result from prior, diverse conversion process, or from the fractionation of various crude oils. Such processes include the catalytic and/or thermal cracking of petroleum, the destructive distillation of wood or coal, shale-oil retorting, etc., and yield various hydrocarbon mixtures which may be advantageously employed as fuels, lubricants, and petro-chemical materials, or as charge stocks in subsequent processes designed for the production thereof. Such hydrocarbon distillate fractions frequently contain impurities which must necessarily be removed before these distillate fractions are suitable for their intended use, or which, when removed, enhance the value of the distillate fractions for further processing. These impurities include sulfurous compounds, nitrogenous compounds, oxygenated compounds, and various metallic contaminants which cause the hydrocarbon distillates to exhibit corrosive tendencies and be foul-smelling, thereby making them less desirable for further utilization as a fuel or lubricant, or otherwise.

Probably the most prevalent of the aforementioned impurities is combined sulfur which may exist in the hydrocarbon fraction as a sulfide, mercaptan, or as thiophenic sulfur, etc. The combined sulfur is generally removed by the process of hydrodesulfurization, wherein the sulfur-bearing molecule is treated at an elevated temperature, generally in excess of about 500° F., and usually at a higher temperature of the order of about 700° F. The hydrodesulfurization reaction is effected in the presence of hydrogen and a suitable catalytic composite whereby the molecules are converted to their corresponding hydrocarbon counterpart and hydrogen sulfide, the latter being removed from the process as a gaseous waste material. The hydrodesulfurization treatment is also effective in removing nitrogen-bearing molecules by converting them to the hydrocarbon counterpart and ammonia, the latter either being removed in a gaseous phase, or absorbed from the liquid product effluent. When existing in some combined form, oxygen offers less of a removal problem than either sulfur or nitrogen. Under the operating conditions employed, oxygenated compounds are readily converted to the hydrocarbon counterpart and water, the latter being removed from the hydrocarbon product by any well-known and suitable separation means.

However, in addition to the aforementioned contaminants, the hydrocarbon distillates resulting from the various conversion processes hereinbefore set forth, contain an appreciable quantity of unsaturated hydrocarbons, both mono-olefinic and diolefinic, the latter including compounds such as styrene, isoprene, dicyclopentadiene, etc. When these highly unsaturated hydrocarbon distillates are subjected to hydrodesulfurization, for the purpose of removing sulfur, nitrogen and oxygen, there frequently is encountered the difficulty of effecting the desired degree of reaction due to the formation of coke and other heavy carbonaceous material. The deposition of the coke and other carbonaceous material appears to be an inherent result of the necessity to effect the hydrodesulfurization process at elevated temperatures, generally in excess of about 500° F. Various heaters and miscellaneous appurtenances of the conversion zone, experience heavy coking; this appears as the formation of solid, highly carbonaceous material resulting from the thermal reaction of the unstable or coke-forming compounds within the hydrocarbon distillate being charged to the unit. In addition, polymerization and copolymerization of the mono-olefins and diolefins are effected within the reaction zone, and to the extent that the catalyst disposed therein becomes shielded by gummy polymerization products, from the hydrocarbon distillate being processed. As hereinbefore set forth, coke-forming hydrocarbon distillates are usually those resulting from prior severe conversion treatments, such as catalytic or thermal cracking, or destructive distillation. These distillates are available in a large quantity, and generally require the hydrodesulfurization treatment for the purpose of enchancing the possibilities of further usefulness. In many instances, the hydrocarbon distillate will not contain excessive quantities of sulfurous and nitrogenous compounds, but will consist of detrimentally large amounts of mono-olefins and diolefins to the extent that the subsequent use of the hydrocarbon distillate is prohibited. For example, in a thermal cracking process for the production of ethylene, a full boiling range hydrocarbon product, having an initial boiling point of from about 100° F. to about 150° F., and an end boiling point in excess of about 400° F. and containing less than 1000 p.p.m. each of the sulfur and/or nitrogen, is produced as a normally liquid by-product. This normally liquid hydrocarbon mixture contains olefinic hydrocarbons of an amount to indicate a bromine number of the order of at least about 50.0 and diolefinic hydrocarbons of an amount to indicate a diene value of the order of about 25.0 or more. In addition, a hydrocarbon distillate of this nature generally contains sufficient aromatic hydrocarbons to warrant treating the hydrocarbon distillate to recover substantially pure aromatic concentrates. Regardless of its intended use, as a motor fuel blending component, fuel oil, lubricant, or as charge material for subsequent processing, such as in an aromatic recovery unit, it is generally necessary to subject such a hydrocarbon distillate to hydrodesulfurization for the purpose of removing the various contaminating influences.

The hydrorefining of a highly unsaturated distillate, such as the liquid by-product above described, gives rise to certain difficulties inherently occurring at the conditions of operation required to achieve an efficient hydrorefining process. The presence of the mono-olefins and diolefins induces the formation of coke and high-molecular weight polymerization products within the attendant manifolding of the process, and onto the catalytic composite being employed, thereby shielding the latter from the material being processed. I have found that this difficulty may be overcome by effecting the hydrorefining process in separate, distinctly individual stages; the distillate is first treated, in the presence of hydrogen, at a temperature less than about 500° F., for the purpose of effecting at least partial saturation of the diolefins, and subsequently is treated at a temperature in excess of 500° F., for the purpose of removing the various contaminants and to complete the saturation of the hydrocarbon distillate. I have further found, however, that the inclusion of the heavier unsaturated hydrocarbons, those boiling above about 250° to about 280° F., within the charge stock to the first stage of a two-stage process, results in a significant degree of co-polymerization with the lighter, unsaturated hydrocarbons, notwithstanding that the operating temperature is such that polymerization of the lighter unsaturated hydrocarbons would not be effected in a great degree in the absence of the heavier material. Therefore, it is a primary object of the present invention to provide a series of processing techniques for the efficient multiple-stage hydrorefining of a full boiling range, unsaturated hydrocarbon distillate without incurring the deposition of coke and undesirable polymerization products. In a broad embodiment, the present invention relates to a process for hydrorefining an unsaturated, coke-forming hydrocarbon distillate which comprises initially fractionating said distillate to provide a light fraction and a heavy fraction, reacting said light fraction and hydrogen in a first reaction zone and separately reacting said heavy fraction and hydrogen in a second reaction zone, combining at least a portion of the effluent from said first zone with at least a portion of the effluent from said second zone and passing the resulting mixture into a third reaction zone; effecting further reaction of said distillate and additional hydrogen, and recycling at least a portion of the effluent from said third reaction zone to combine with the aforesaid light and heavy fractions prior to reacting the same in said first and second reaction zones respectively.

In another embodiment, the present invention provides a process for hydrorefining an unsaturated, coke-forming hydrocarbon distillate, which process comprises initially fractionating said distillate to provide a light fraction having an end boiling point of from about 250° F. to about 280° F. and a heavy fraction having an initial boiling point of from about 250° F. to about 280° F.; reacting said light fraction and hydrogen in a first reaction zone at a temperature less than about 500° F., and separately reacting said heavy fraction and hydrogen in a second reaction zone at a temperature less than about 500° F., combining at least a portion of the effluent from said first zone with at least a portion of the effluent from said second zone, raising the temperature of the resultant mixture and passing the heated mixture into a third reaction zone; effecting further reaction of said distillate and additional hydrogen at a temperature in excess of about 500° F., and recycling at least a portion of the effluent from said third reaction zone to combine with the aforesaid light and heavy fractions prior to reacting the same in said first and second reaction zones respectively.

A more limited embodiment of the present invention involves a process for hydrorefining an unsaturated, coke-forming hydrocarbon distillate which comprises initially fractionating said distillate to provide a light fraction having an end boiling point of from about 250° F. to about 280° F. and a heavy fraction having an initial boiling point of about 250° F. to about 280° F.; reacting said light fraction and hydrogen in a first reaction zone at a temperature within the range of from about 300° F. to about 500° F. and separately reacting said heavy fraction and hydrogen in a second reaction zone at a temperature of from about 300° F. to about 500° F., combining at least a portion of the effluent from said first zone with at least a portion of the effluent from said second zone, raising the temperature of the resultant mixture and passing the heated mixture into a third reaction zone; effecting further reaction of said distillate and additional hydrogen at a temperature within the range of from about 500° F. to about 800° F. and recycling at least a portion of the effluent from said third reaction zone to combine with the aforesaid light and heavy fractions in an amount to result in a combined feed ratio, to each of said first and second reaction zones, within the range of from about 2:1 to about 6:1, the process further characterized in that said first, second and third reaction zones contain a catalytic composite of at least one metallic component from the group of metals of groups VI–A and VIII of the periodic table, and compounds thereof.

From the foregoing embodiments, it is readily ascertained that the process of the present invention, for the hydrorefining of a full boiling range unsaturated, coke-forming hydrocarbon distillate, involves the utilization of at least three individual, distinctly separated reaction zones. Through the utilization of a particular sequence of processing steps, at particular operating conditions, the formation of high molecular weight polymers and co-polymers, and the yield loss represented by the deposition of coke and other carbonaceous material, is inhibited to a degree which permits processing for an extended period of time. The sequence of processing steps, hereinafter set forth in greater details, regulates the hydrorefining process in such a manner that the charge stock is never at conditions which selectively promote either coke-forming, or polymerization and co-polymerization reactions during the course of the process, but which is ultimately subjected to hydrorefining at those conditions which would ordinarily produce coke and polymerization products were it not for the particular sequence of processing steps. Briefly, the object of the present invention is accomplished by initially fractionating the material to be processed into a light fraction and a heavy fraction, the cut-point being at a temperature of about 250° F. to about 280° F., initiating the hydrorefining of each of the two resulting hydrocarbon fractions at temperatures below about 500° F. and in the presence of a previously hydrorefined, substantially saturated liquid product, at which temperatures diolefinic hydrocarbons are selectively saturated, at least in part, without the attendant coke-forming polymerization reactions also being promoted. Following the initial saturation of the light and heavy fractions, the effluent products from each of the first two reaction zones are combined, at least in part, and subjected to further hydrorefining in a third reaction zone for the purpose of removing the contaminating sulfurous and nitrogenous compounds and to complete the saturation of the diolefinic hydrocarbons as well as the original monoolefinic hydrocarbons. Thus, as the fresh hydrocarbon charge stock passes through the series of processing steps, the operating conditions are imposed at the necessary desired level, but only as is consistent with the coke-forming and polymerization tendencies of the material being processed.

In a preferred embodiment, the process of the present invention is effected in a sequence of contacting zones, each of which functions at operating conditions which are consistent with the chemical characteristics of the particular hydrocarbon mixture passing therethrough. That is, the hydrocarbon distillate is subjected to hydrorefining under the most advantageous conditions, and in such a manner as to preclude the presence of other hydrocarbons having an adverse influence upon the desired hydrorefining reactions. Thus, an essential feature of the present process, for hydrorefining a full boiling range hydrocarbon distillate, is to fractionate said distillate at a cut-point of from about 250° F. to about 280° F., prior to contacting any portion thereof with the catalytic composite disposed within the reaction zones. In some situations, an extreme degree of unsaturation of the charge stock may result in too great a temperature rise in the reaction zones, due to the exothermicity of the reaction. That is, the degree of hydrogenation being effected in a particular reaction zone is indicated the temperature differential experienced across the catalyst disposed therein. In such instances, it may be desirable to provide for multipoint introduction of the charge stock at various intermediate sections of the reaction zone, to prevent a high degree of saturation from occurring in one particular portion of the catalyst, and also to provide cooling of the charge stream as it passes through the reaction zone. On the other hand, internal quench streams of a previously hydrorefined material may be employed when excessive temperature rise is an aspect to be considered. Preferably, and particularly in large scale commercial installations, the process of the present invention is most advantageously effected in three or more reaction zones having adequate heat-exchange facilities therebetween.

The process of the present invention may be understood more clearly through reference to the accompanying drawing. It is understood that the drawing, as well as the explanation thereof, is given for the purpose of illustration; it is not intended to limit the process of the present invention to the particular flow so illustrated. In the interest of simplicity and clarity, various heaters, condensers, valves, controls, instruments, etc., have been eliminated from the drawing; only those vessels and connecting lines necessary for the complete understanding of the process are indicated. In explanation of the drawing, the hydrocarbon charge stock will be assumed to be a full boiling range hydrocarbon distillate having an initial boiling point of about 125° F. and an end boiling point of about 500° F., and containing about 1000 p.p.m. each of combined sulfur and nitrogen.

Referring now to the drawing, the hydrocarbon charge stock is first introduced through line 1, being separated in fractionator 2 to provide a light fraction having an end boiling point of about 260° F., leaving via line 3, and a heavy fraction having an initial boiling point of about 260° F., leaving via line 18. The light fraction in line 3 is raised to the operating pressure, imposed upon reactor 7, by pump 4, passes through heat-exchanger 5, wherein it is raised to the desired temperature, prior to entering reactor 7 via line 6. Reactor 7 will be maintained under an imposed pressure of from about 450 pounds to about 900 pounds per square inch, the light fraction entering line 6 being at a temperature within the range of from about 300° F. to about 500° F. Prior to entering heat-exchanger 5, the light fraction in line 3 is combined with a previously hydrorefined product effluent in line 39 containing pump 40, the hydrorefined product being withdrawn from recycle pot 36; the source of this hydrorefined product recycle stream is hereinafter described. The recycle is employed in an amount to result in a combined feed ratio to reactor 7 in excess of about 2:1. The combined feed ratio, is, of course, defined as the ratio of the total liquid hydrocarbon charge to reactor 7, to the fresh hydrocarbon charge contained therein; preferably, the combined feed ratio will have an upper limit of about 6:1.

The light fraction in line 3, prior to passing through heat-exchanger 5, is also admixed with an internally recycled, hydrogen-rich gas stream from line 26, the latter having been raised to the desired operating pressure by compressor 25. An essential feature of the present invention is that the temperature of the material entering reactor 7, being a mixture of the aforementioned light fraction having an end boiling point of about 260° F., recycled hydrogen, and at least a portion of a previously hydrorefined product effluent, be less than about 500° F., having a lower limit of about 300° F., at which temperature at least partial hydrogenation of the diolefins and mono-olefins is effected without the attendant polymerization and copolymerization thereof. The inclusion within the charge to the reactor 7, of a previously hydrorefined product effluent is necessary in order to further insure against the formation of polymerization products. Reactor 7 is maintained under a pressure within the range of about 450 to about 900 pounds per square inch, which pressure is approximately 20 pounds per square inch higher than that maintained upon reactor 12, the third stage of the present process, in order to compensate for the normal pressure drop experienced in passing the material to be processed from reactor 7 through the attendant manifolding into reactor 12.

The heavy fraction, leaving fractionator 2, passes through line 18, being raised to the desired operating pressure by pump 19, and is passed through heat-exchanger 14 and line 20 into reaction zone 21. As stated with respect to the light fraction, the heavier fraction, prior to being raised to the desired temperature level via heat-exchanger 14, is admixed with a previously hydrorefined product effluent in line 37, containing pump 38, from recycle pot 36, and is further admixed with at least a portion of the internally recycled, hydrogen-rich gas stream from compressor 25 via lines 26 and 27. The operating conditions imposed upon reactor 21 are essentially the same as those under which reaction zone 7 functions. The exclusion of unsaturated hydrocarbons boiling below about 250° to 280° F., from the charge to the reaction zone 21, aids in preventing the formation of excess quantities of polymerization products and the deposition of coke and other carbonaceous material. The product effluent from reactor 21, substantially free from diolefinic hydrocarbons boiling in excess of a temperature of about 260° F., passes through line 9, being admixed with the product effluent from reactor 7 in line 8, and continues through heater 10 and line 11 into reactor 12, the third zone of the present process. Prior to entering heater 10, wherein the charge to reactor 12 is raised to the desired operating temperature within the range of about 500° F. to about 800° F., the charge is admixed with make-up hydrogen in line 30 from compressor 29, entering the process via line 28. The make-up hydrogen, entering the process via line 28, is employed in an amount to compensate for that hydrogen which is consumed within the three reaction zones in the process of hydrogenating the unsaturated hydrocarbons, and effecting the destructive removal of sulfurous and nitrogenous compounds. Reactor 12 is maintained under an imposed pressure of from about 450 to about 900 pounds per square inch, however, as hereinabove set forth, at a slightly lower pressure than that imposed upon either reactor 21 or reactor 7. The elevated temperature in reactor 12 is necessary to complete the saturation of the diolefinic and mono-olefinic hydrocarbons, and to convert any remaining nitrogenous and sulfurous compounds into ammonia, hydrogen sulfide and the hydrocarbon counterpart thereof. When the process is operating efficiently, the diene value of the liquid hydrocarbons entering reaction zone 12, a measure of the concentration of the diolefinic hydrocarbons, will be less than about 2.0 and preferably less than about 1.5. The greater degree of conversion of nitrogenous and sulfurous compounds, contained within the hydrocarbon charge, is effected in the first and second reaction zones, along with at least the partial saturation of the diolefinic hydrocarbons to yield additional mono-olefinic hydrocarbons, and completely saturated hydrocarbons; the third reaction zone serves the primary function of hydrogenating the remaining original mono-olefins and completing the saturation of the diolefins, without the attendant saturation of the highly desirable aromatic hydrocarbons contained within the original hydrocarbon charge.

The total product effluent from reaction zone 12, the normally liquid portion of which is substantially completely saturated, is passed via line 13 through heat-exchangers 14 and 5, and subsequently being further cooled to approximately room temperature in cooler 15 prior to passing through line 16 into separator 17. Separator 17 operates under essentially the identical pressure as reaction zone 12, and, in fact, is that point within the process from which the operating pressure imposed upon the three reaction zones is controlled. Furthermore, the control of the operating pressure of separator 17 may be employed as an indication of the quantity of make-up hydrogen which must necessarily be added to the process via line 28, compressor 29, and line 30. Separator 17 operates at essentially ambient temperature of the order of 100° F. or less, and serves to separate the total product effluent from reactor 12 into a gaseous phase and a normally liquid hydrocarbon phase. The gaseous phase, substantially rich in hydrogen, and containing ammonia, hydrogen sulfide, and light paraffinic hydrocarbons such as methane, ethane, and propane, is withdrawn from separator 17 via line 22, being passed into compressor 25, discharging therefrom through line 26, and subsequently being admixed with the light fraction in line 3 and the heavy fraction in line 18. At least a portion of the gaseous phase in line 22 is removed from the process via line 23 containing pressure control valve 24, for the purpose of preventing a build-up within the system of the ammonia and hydrogen sulfide resulting from the conversion of the contaminating sulfurous and nitrogenous compounds.

At least a portion of the normally liquid product effluent from separator 17 is removed through line 31, continuing therethrough into recycle pot 36 for the purpose of supplying the hydrorefined product effluent which is admixed with the light fraction in line 3 and the heavy fraction in line 18 by means of pumps 40 and 38, respectively. As hereinbefore set forth, pumps 40 and 38 are controlled such that the combined feed ratio of the total liquid hydrocarbon material entering reaction zones 7 and 21 lies within the range of from about 2:1 to about 6:1. The excess liquid hydrocarbon effluent from separator 17 passes through line 32 into stripper 33, the latter serving to remove additional ammonia, hydrogen sulfide, and light paraffinic hydrocarbons from the system via line 34. The final liquid product is removed from the system via line 35, and consists essentially of paraffinic hydrocarbons, naphthenic hydrocarbons and aromatic hydrocarbons.

As indicated in the drawing, the source of the hydrorefined product being recycled to combine with the fresh hydrocarbon charge, is the total normally liquid product effluent from separator 17, being removed therefrom via line 31. This particular method is preferred to that method which would obtain the hydrorefined product recycle from the bottoms fraction of stripper 33, although the latter method has the advantage of recycling only the liquid portion of the hydrorefined product. The scheme illustrated has the advantage of being essentially at the operating pressure of reaction zones 7 and 21, and does not, therefore, require extensive repressuring. Furthermore, the size of the vessel required to serve as stripper 33 is lessened significantly when the recycled hydrorefined product is withdrawn from separator 17. In some instances, the product stream being recycled may be obtained from both sources for the purpose of facilitating the control of the various temperatures and flow rates within the process. Other various modifications may be made to the illustrated embodiment by those possessing skill within the art of petroleum processing, and it is not intended that such modifications shall remove the resulting process from the broad scope and spirit of the appended claims. To illustrate, separator 17 may be combined with additional separating and/or absorbing means, whereby a somewhat different flow pattern and apparatus set up results. For example, water-injection may be provided in line 16 for the purpose of absorbing the ammonia therein, the water and absorbed ammonia being removed by suitable liquid level control means from separator 17. Similarly, the gaseous phase from separator 17 in line 22, may be so treated as to effect substantially complete removal of hydrogen sulfide and/or light paraffinic hydrocarbons. Also, through the use of a suitable piping arrangement, recycle pot 36 may be eliminated, the rate of hydrorefined product being recycled then being controlled through the use of pumps 38 and 40, in conjunction with suitable liquid-level control means. As hereinabove set forth, such modifications are readily recognized by those possessing skill within the art, and are not intended to limit unduly the process of the present invention.

The fresh hydrocarbon charge to the reaction zones 7 and 21 will be in an amount to result in a liquid hourly space velocity (defined as volumes of hydrocarbon charge per volume of catalyst disposed within the reaction zone) within the range of from about 0.5 to about 10.0. As hereinbefore stated, the quantity of previously hydrorefined product effluent being recycled via lines 39 and 37, to combine with the fresh hydrocarbon charge in lines 3 and 18 respectively, will be of an amount such that the combined feed ratio to each of reaction zones 7 and 21 lies within the range of from about 2:1 to about 6:1. The recycled hydrogen-rich gas stream, being admixed with the hydrocarbon charge to reaction zones 7 and 21 will be of an amount within the range of from about 500 to about 2500 standard cubic feet per barrel of hydrocarbon charge to each of the reaction zones. It is preferred, and a more efficient operation is effected when the hydrogen being recycled is less than about 1000 standard cubic feet per barrel of the total hydrocarbon charge entering the two reaction zones. Make-up hydrogen may be introduced into the process from any suitable exterior source, and will be of an amount to compensate for that quantity of hydrogen being consumed within the three stages of the process for the destructive removal of sulfurous and nitrogenous compounds, and for the saturation of the diolefinic and mono-olefinic hydrocarbons. The make-up hydrogen actually enters the process in the effluent line from the first two stages of the operation: by this method, only the fresh hydrocarbon charge is permitted to pass into the first two reaction zones without having been processed in at least one of the three reaction zones.

The three-stage hydrorefining process of the present invention is a catalytic process, and the catalyst employed may be of the same chemical and physical composition in all three of the reaction zones. Suitable hydrorefining catalytic composites comprise metallic components selected from the group consisting of groups VI–A and VIII of the periodic table, and compounds thereof. Thus, the catalyst will comprise at least one metallic component selected from the group consisting of chromium, molybdenum, tungsten, iron, cobalt, nickel, ruthenium, rhodium, palladium, osmium, iridium, platinum, and mixtures of two or more, etc. The preferred catalytic composite, for utilization in the three-stage process of the present invention, comprises molybdenum and at least one metallic component selected from the iron-group of the periodic table. The molybdenum component will generally be in the greater concentration, from about 4.0% to about 30.0% by weight, while the iron-group metallic component will be present in an amount within the range of from about 1.0% to about 6.0% by weight, such concentrations being calculated on the basis of the elements. An essential feature of the catalytic composite is that the catalytically active metallic components, hereinabove set forth, be supported on a non-acidic carrier material. Generally, catalytically active metallic components are composited with any suitable refractory inorganic oxide material including alumina, silica, zirconia, thoria, hafnia, magnesia, titania, mixtures of two or more, etc. Similarly, other components are often combined with metallic components and carrier material; these generally include the members of the halogen family, particularly fluorine and/or chlorine. However, these components, as well as some of the various refractory inorganic oxides above set forth, impart a particular acid-acting function to the catalytic composite, which function is not desirable in the process of the present invention. For example, a carrier material comprising a combination of alumina and silica, will possess sufficient hydrocracking activity to affect detrimentally the attainment of the specific object of the present invention. Therefore, it is an essential feature of the process of the present invention that the catalytically active metallic components be composited with a non-acidic refractory inorganic oxide carrier material, the term being specifically intended to preclude the utilization of members of the halogen family and other components which might impart an acid-acting function to the catalytic composite. Therefore, a particularly preferred carrier material, for utilization in manufacturing the catalyst employed in the process of the present invention, comprises alumina in its many anhydrous forms, or as aluminum hydroxide. Although any suitable means may be employed for the manufacture of the catalytic composite, a convenient method involves the use of impregnating techniques on a preformed alumina carrier material. For example, a catalyst consisting essentially of about 2.2% by weight of cobalt, and about 5.7% by weight of molybdenum, calculated as the elements thereof, may be prepared by impregnating alumina particles of any suitable size and/or shape with a single impregnating solution of suitable water-soluble compounds of cobalt and molybdenum. A double impregnation technique may be effected whereby the molybdenum component is first composited, the thus impregnated carrier material being subjected to high-temperature calcination, followed by a second impregnating procedure in which the cobalt component is composited. Suitable water-soluble compounds, for use in preparing the impregnating solution, include molybdic acid, ammonium molybdate, cobalt nitrate hexahydrate, cobalt chloride hexahydrate, nickel nitrate hexahydrate, etc. Following the impregnation, the catalyst is dried at a temperature within the range of from about 200° F. to about 400° F. and thereafter subjected to a calcination procedure, in an atmosphere of air, at an elevated temperature of from about 500° F. to about 1000° F., or more. Following the calcination of the impregnated carrier material, the composite may be treated in any manner designed to cause the metallic components to exist in a particularly desired form. Thus, the composite may be treated for the purpose of converting the metallic components substantially to the form of oxides, sulfides, sulfate, etc.

When the foregoing conditions of operations and processing treatments are followed, the process of the present invention is capable of successful, efficient operation for an extended period of time. However, as with virtually all catalytically conducted processes, there exists an inherent naturally-occurring degree of deactivation of the catalytic composite employed within the reaction zone. Such deactivation is not necessarily the rapid deactivation which conceivably could result from various major operating upsets due to interruptions in flow, abrupt changes in operating conditions, etc. In the present three-stage hydrorefining process, the catalyst will ultimately attain a level of deactivation as a result of the natural deterioration of the catalyst, the deposition of coke and other carbonaceous material during the prolonged period of operation, and the formation of various polymerization products, all of which have the tendency to shield the active centers and surfaces of the catalyst from the material being processed. Although the processing techniques of the present invention permit the utilization of the catalytic composite for an extended period of time, by virtually eliminating the polymerization and co-polymerization reactions, it is practically impossible for such elimination to be effected completely. Similarly, the deposition of coke and other carbonaceous material will eventually attain the level at which the catalyst becomes deactivated to the extent that the process is no longer economically feasible. In such instances, the catalyst may readily be reactivated by a rather simple expediency which does not require an extended period of down-time. Following a prolonged period of operation, when it appears that the catalyst has become deactivated to the extent that reactivation is desirable, the introduction of hydrocarbon charge stock is ceased, but the plant pressure is maintained by continuing the circulation of the hydrogen-rich recycle gas stream. For the purposes of regeneration, the temperature of the first and second stages of the present process is increased to a level within the range of that normally maintained upon the third reaction zone. That is, within the range of from about 500° F. to about 800° F. The circulating hydrogen-rich gas stream serves to strip the catalyst of the various polymerization products formed during the period of operation, and effects such stripping in the relatively short period of time of from about 8 to about 12 hours. In those instances where the catalytic deactivation appears to have resulted from the deposition of coke and carbonaceous material, such material may be effectively removed by burning in an atmosphere of air. The temperature upon the first and second stage reaction zones is then decreased to a level below about 500° F., and the fresh hydrocarbon charge, in admixture with hydrorefined recycled product, is reintroduced to the system.

The following example is given to illustrate further the process of the present invention, and to indicate the benefits afforded through the utilization thereof. It is not intended to limit unduly the process of the present invention to the charge stock, operating conditions, and/or catalytic composite employed therein.

*Example*

The hydrocarbon distillate employed in this example is a full boiling range naphtha by-product from a commercial cracking unit designed and operated for the production of ethylene. The primary object, for which this hydrocarbon distillate is to be hydrorefined, is to utilize the hydrorefined product effluent as charge material to a unit designed for the recovery of the aromatic hydrocarbons contained in this particular hydrocarbon distillate in an amount of about 50% by volume. A hydrocarbon distillate of this nature is further characterized by a large proportion of mono-olefinic hydrocarbons and diolefinic hydrocarbons, and is contaminated by sulfurous and nitrogenous compounds in an amount of about 1000 p.p.m. each. The charge stock, having a gravity, ° API at 60° F., of about 37.5, has an initial boiling point of about 125° F. and an end boiling point of about 500° F. The unsaturated hydrocarbons are concentrated in the lower-boiling portion of this particular charge stock, that fraction having an end boiling point of about 260° F. indicating a diene value of about 30.0 and a bromine number of about 70.0; the heavier fraction indicates a diene value of about 15.0 and a bromine number of about 35.0. Prior to being processed according to the method of the present invention, this particular hydrocarbon charge stock is not suitable as material from which the aromatic hydrocarbons, benzene, toluene, and xylene could be recovered, nor could the remaining portion of the distillate be utilized as a motor fuel blending component or as charge stock to a catalytic reforming unit. Therefore, it becomes necessary to effect the destructive removal of the sulfurous and nitrogenous compounds, and to saturate the olefins and diolefins, performing this function in a manner which insures the continuous production of a material suitable for utilization as charge to the aromatic recovery unit over an extended period of time.

The catalytic composite, within each of the three reaction zones, is a pre-sulfided composite of alumina, 2.2% by weight of cobalt, and 5.7% by weight of molybdenum, the latter being calculated as the elements thereof. The composite is prepared utilizing ⅛-inch by ⅛-inch cylindrical alumina pills, calcined at an elevated temperature of about 1100° F. The cobalt and molybdenum components are composited therewith through the utilization of a single impregnating solution containing the requisite quantities of molybdic acid (85% molybdenum oxide) and cobalt nitrate hexahydrate. Following the impregnation procedure, the impregnated composite is dried, calcined at an elevated temperature of 1000° F., and thereafter sulfided utilizing a mixture of hydrogen and hydrogen sulfide.

The charge stock is initially fractionated to provide a light fraction containing all those components boiling below a temperature of about 260° F., and a heavier fraction containing those components boiling at temperatures in excess of about 260° F. The light fraction is passed into a first reaction zone maintained at an inlet temperature thereto of about 400° F., in the presence of about 1500 standard cubic feet per barrel of recycle hydrogen and a previously hydrorefined liquid product recycle, the latter in an amount to result in a combined feed ratio to the first reaction zone of about 3.5. Similarly, the heavier fraction, in admixture with recycle hydrogen in an amount of about 1500 standard cubic feet per barrel and a previously hydrorefined product recycle stream in an amount to result in a combined feed ratio of about 3.5, is passed into a second reaction zone maintained at an inlet temperature of about 400° F. In this type of operation, various items may be employed to indicate the effectiveness of the operation: the pressure differential measured across each of the reaction zones, or from the discharge of the recycle gas compressor to the controlled pressure of the high pressure separator in the effluent line from the third reaction zone, is indicative of that quantity of polymerization products which have become deposited within the reaction zone and the attendant piping during the course of the process; the temperature differential across any of the catalyst beds is an indication of the degree of hydrogenation being effected within a particular reaction zone. The effluent streams from the first and second reaction zones, now substantially completely free from diolefinic hydrocarbons, as indicated by diene values of less than about 1.5, but containing substantial quantities of monoolefinic hydrocarbons, resulting from those originally contained in the hydrocarbon distillate, and those resulting from the partial hydrogenation of the diolefinic hydrocarbons, are combined. Thus, a measure of the effectiveness of the operation at this particular point thereof, is the diene value of the combined liquid product effluent streams. The combined effluent from the first and second reaction zones is then combined with that quantity of make-up hydrogen required to compensate for the amount consumed in effecting the over-all process, the mixture being raised to an elevated temperature of about 600° F., and passed into the third reaction zone. As hereinbefore stated, the temperature differential across the catalyst bed is an indication of the quantity of hydrogenation being effected therein. Since hydrogenation is an exothermic reaction, the temperature at the outlet of the reaction zone will be substantially greater than the temperature at the inlet to the catalyst bed. Therefore, as illustrated in the accompanying drawing, the product effluent from the third reaction zone is a convenient source of material which may be utilized as a heat-exchange medium to raise the temperature of the charge to the first and second reaction zones to the desired level.

Following its utilization as a heat-exchange medium, the effluent product from the third reaction zone is further cooled to a temperature of about 100° F. or less, and is passed into a high-pressure separator for the purpose of removing a hydrogen-rich gas stream containing ammonia and hydrogen-sulfide, at least a portion of which is withdrawn on pressure control for the purpose of maintaining a relatively high degree of hydrogen purity. The remaining portion of the gaseous hydrogen-rich stream is recycled to combine with the liquid charge to the first and second reaction zones in predetermined amounts of about 1500 standard cubic feet per barrel of charge. The normally liquid product effluent, following separation in the high-pressure separator, is passed into a suitable stripping column which serves to remove light paraffinic hydrocarbons and any remaining ammonia and hydrogen sulfide. An indication of the over-all effectiveness of the entire process is the measure of the bromine number and diene value of the stripper bottoms product. The stripper bottoms, that is, the ultimate charge to the aromatic recovery unit, indicates a diene value of from about 0.15 to 0.30, and a bromine number substantially less than about 0.5. The low evaluation of diene value and bromine number, on the stripper bottoms product, plus the fact that the over-all pressure drop across the unit is not noticeably increasing to a prohibitive level, indicates that the process as herein set forth is capable of efficient operation for an extended period of time. It should be noted that those components of the original hydrocarbon distillate which would normally tend to co-polymerize with each other, under the processing conditions imposed upon the first and second reaction zones, that is, the unsaturated components boiling above about 260° F. and those boiling below about 260° F., have been individually treated in a manner which causes such components to become innocuous, whereby they may be subsequently combined and further treated to achieve the ultimate object. Furthermore, each individual fraction is separately treated under those conditions which inhibit excessive polymerization during the course of the operation.

Through the particular processing techniques of the present invention, it is possible to hydrorefine successfully a full boiling range, coke-forming hydrocarbon distillate without the attendant operating difficulties resulting from excessive deposition of coke and carbonaceous material, as well as the formation of polymerization and co-polymerization products.

I claim as my invention:

1. A process for hydrorefining an unsaturated, coke-forming hydrocarbon distillate which comprises initially fractionating said distillate to provide a light fraction having an end boiling point of from about 250° F. to about 280° F. and a heavy fraction having an initial boiling point of from about 250° F. to about 280° F.; reacting said light fraction and hydrogen in a first reaction zone at a temperature less than about 500° F., and separately reacting said heavy fraction and hydrogen in a second reaction zone at a temperature less than about 500° F., combining at least a portion of the effluent from said first zone with at least a portion of the effluent from said second zone, raising the temperature of the resultant mixture and passing the heated mixture into a third reaction zone; effecting further reaction of said mixture with an additional hydrogen in said third zone at a temperature in excess of about 500° F., separating the effluent from said third reaction zone into a gaseous product and a liquid product, and commingling separate portions of said liquid product with the aforesaid light and heavy fractions prior to reacting the same in said first and second reaction zones respectively.

2. The process of claim 1 further characterized in that the reactions within said first and second reaction zones are effected at a temperature within the range of from about 300° F. to about 500° F., and the reactions within said third reaction zone are effected at a temperature within the range of from about 500° F. to about 800° F.

3. The process of claim 1 further characterized in that liquid product from said third reaction zone is commingled with said light and heavy fractions in an amount to result in a combined feed ratio, to each of said first and second reaction zones, in excess of about 2:1.

4. The process of claim 3 further characterized in that said combined feed ratio is within the range of from about 2:1 to about 6:1.

5. A process for hydrorefining an unsaturated, coke-forming hydrocarbon distillate which comprises initially fractionating said distillate to provide a light fraction having an end boiling point of from about 250° F. to about 280° F. and a heavy fraction having an initial boiling point of about 250° F. to about 280° F.; reacting said light fraction and hydrogen in a first reaction zone at a temperature within the range of from about 300° F. to about 500° F. and separately reacting said heavy fraction and hydrogen in a second reaction zone at a temperature of from about 300° F. to about 500° F., combining at least a portion of the effluent from said first zone with at least a portion of the effluent from said second zone, raising the temperature of the resultant mixture and passing the heated mixture into a third reaction zone; effecting further reaction of said mixture with additional hydrogen in said third zone at a temperature within the range of from about 500° F. to about 800° F., separating the effluent from said third reaction zone into a gaseous product and a liquid product, and commingling separate portions of said liquid product with the aforesaid light and heavy fractions in an amount to result in a combined feed ratio, to each of said first and second reaction zones, within the range of from about 2:1 to about 6:1, the process further characterized in that said first, second and third reaction zones contain a catalytic composite of at least one metallic component from the group of metals of groups VI-A and VIII of the periodic table, and compounds thereof.

6. The process of claim 5 further characterized in that the catalytic composite disposed within said first, second and third reaction zones comprises molybdenum and at least one metallic component from the metals of the iron-group of the periodic table, and compounds thereof.

7. The process of claim 5 further characterized in that the catalytic composite disposed within said first, second and third reaction zones comprises a non-acidic refractory inorganic oxide.

8. A process for hydrorefining an unsaturated, coke-forming hydrocarbon distillate which comprises initially fractionating said distillate to provide a light fraction having an end boiling point of from about 250° F. to about 280° F. and a heavy fraction having an initial boiling point of from about 250° F. to about 280° F.; reacting said light fraction and hydrogen at a temperature within the range of from about 300° F. to about 500° F. in a first reaction zone containing a hydrorefining catalytic composite, and separately reacting said heavy fraction and hydrogen, at a temperature within the range of from about 300° F. to about 500° F., in a second reaction zone containing a hydrorefining catalytic composite, combining at least a portion of the effluent from said first zone with at least a portion of the effluent from said second zone, raising the temperature of the resultant mixture and passing the heated mixture into a third reaction zone containing a hydrorefining catalytic composite; effecting further reaction of said mixture with additional hydrogen in said third zone, at a temperature within the range of from about 500° F. to about 800° F., separating the effluent from said third reaction zone into a gaseous product and a liquid product, and commingling separate portions of said liquid product with the aforesaid light and heavy fractions in an amount to result in a combined feed ratio, to each of said first and second reaction zones, within the range of from about 2:1 to about 6:1, the process further characterized in that said hydrorefining catalyst, disposed within said first, second and third reaction zones, is a composite of a non-acidic refractory inorganic oxide, from about 4.0% to about 30.0% by weight of molybedum and from about 1.0% to about 6.0% by weight of at least one metallic component from the metals of the iron-group of the periodic table, and compounds thereof.

References Cited in the file of this patent
UNITED STATES PATENTS

| | | |
|---|---|---|
| 2,303,118 | Frey | Nov. 24, 1942 |
| 2,878,179 | Hennig | Mar. 17, 1959 |
| 2,901,417 | Cook et al. | Aug. 25, 1959 |
| 2,983,676 | Howland | May 9, 1961 |